UNITED STATES PATENT OFFICE.

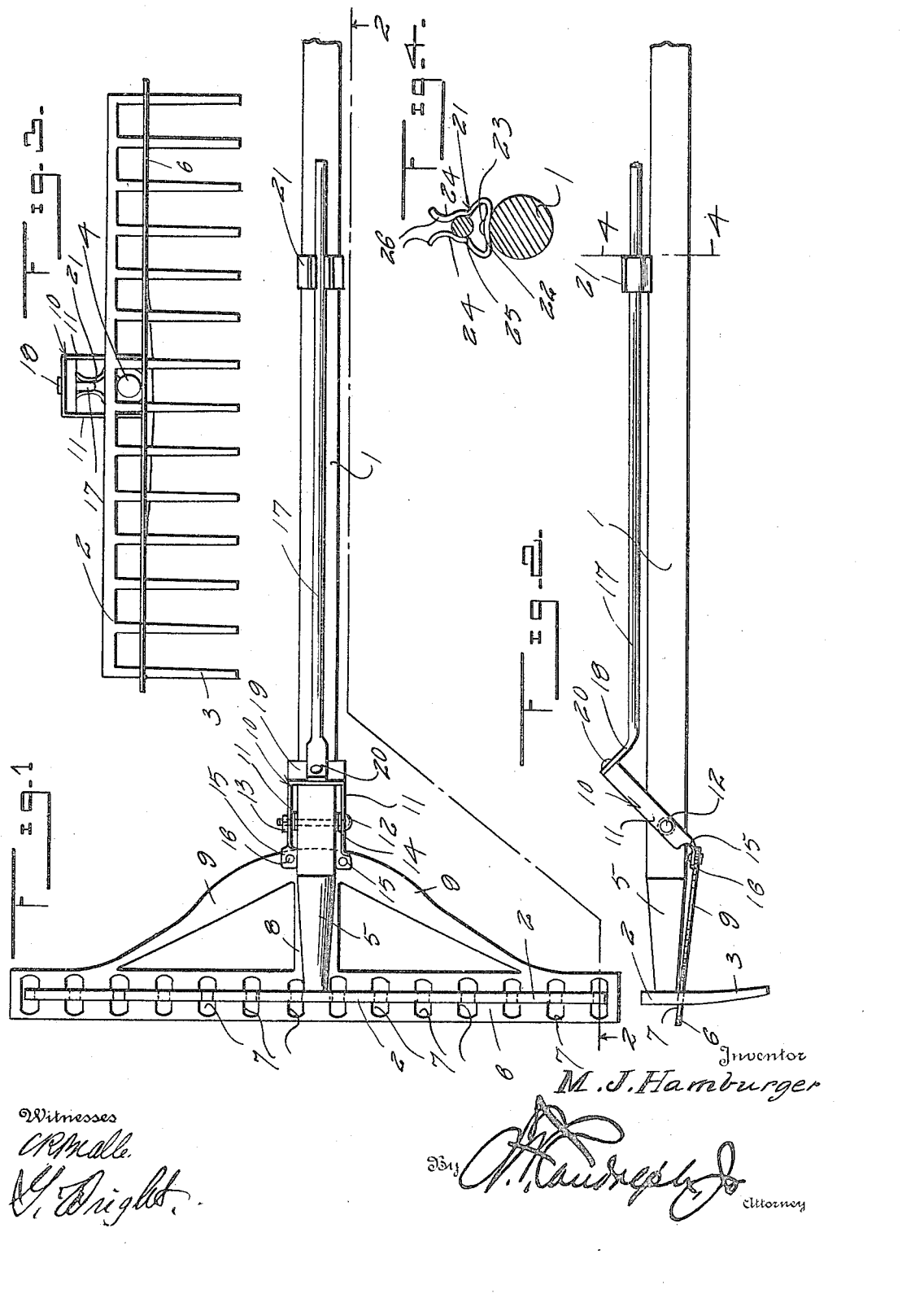

MARY J. HAMBURGER, OF BAYPORT, NEW YORK.

SELF-CLEANING RAKE.

1,255,742. Specification of Letters Patent. Patented Feb. 5, 1918.

Application filed September 7, 1917. Serial No. 190,180.

*To all whom it may concern:*

Be it known that I, MARY J. HAMBURGER, a citizen of the United States, residing at Bayport, Long Island, in the county of Suffolk and State of New York, have invented certain new and useful Improvements in Self-Cleaning Rakes; and I do hereby declare the following to be a full, clear, and exact description of the invention, such as will enable others skilled in the art to which it appertains to make and use the same.

This invention relates to self-cleaning rakes and is an improvement on Patent #1,234,755, issued to me July 5, 1917, and the primary object of the invention is to generally simplify and improve the construction of the rake as illustrated in my prior patent.

Another object of the invention is to provide an improved method of attaching the operating handle to the stripping plate and for attaching the operating handle to the rake handle.

A further object of the invention is to provide an improved self-cleaning rake, which is durable and efficient in use, one that is simple and easy to manufacture and one that can be placed upon the market at a reasonable price.

With these and other objects in view, the invention consists in the novel construction, arrangement and formation of parts, as will be hereinafter more specifically described, and claimed and illustrated in the accompanying drawings, forming a part thereof in which:—

Figure 1 is a top plan view of the improved self-cleaning rake,

Fig. 2 is a section taken on the line 2—2 of Fig. 1,

Fig. 3 is an end elevation of the improved rake head, and

Fig. 4 is a transverse section on the line 4—4 of Fig. 2.

Referring to the drawing in detail wherein similar reference numerals designate corresponding parts throughout the several views, the numeral 1 designates a rake handle of the ordinary construction, 2 the rake head and 3 spaced teeth of the ordinary construction and carried by said rake head. The rake head 2 is connected to the handle 1 by means of a tongue 4 which is formed integrally with the head 2 and is bent back from between the teeth 3. A suitable ferrule 5 surrounds the end of the handle 1 and holds the tongue 4 in position. The improved stripping means consists of an approximately flat rectangular metallic stripping plate 6 that is provided with a plurality of spaced parallel longitudinal slots 7 therein which receive the teeth 3. An extension 8 is formed on the central rear edge of the plate 6 and formed integrally with the extension on opposite sides and adjacent the outer end thereof are integral diagonal braces 9 which extend to the rectangular plate. The improved stripping means is preferably stamped out of an integral flat plate. Pivotally secured upon the handle 1 is a U-shaped attaching member 10 which has its legs 11 provided with registering apertures which receive a pivot pin 12 that extends through an aperture formed in the rake handle 1. The end of the pin 12 is threaded and receives a nut 13 which holds the same in position. Suitable spacing washers 14 are positioned intermediate the legs 11 of the U-shaped member 10 and the rake handle 1.

The outer ends of the legs 11 of the U-shaped member 10 are positioned at right angles to provide attaching feet 15, which are riveted as at 16 to the inner end of the extension 8 and diagonal braces 9. An operating handle 17 has its outer end bent upwardly and flattened as at 18 to provide means for engaging the bight portion 19 of the U-shaped member 10, which extends above the rake handle 1. Suitable fastening elements 20 extend through the flat portion 18 of the operating lever 17 and through the bight portion 19 of the U-shaped member. The legs 11 of the U-shaped member 10 straddle the rake handle 1 and the outer end thereof extends below the same as clearly shown in Fig. 2. The operating handle 17 is preferably formed relatively long and extends longitudinally of the rake handle 1.

A spring clip 21 is secured to the upper surface of the rake handle 1 adjacent the free end of the operating handle 17 and this clip includes the base portion 22 which is slightly curved to conform to the curvature of the rake handle 1 and is secured to the handle by suitable fastening elements 23 and upwardly extending legs 24, which are bent inwardly as at 25 to provide spring engaging members and then bent outwardly as at 26 to form a guide for positioning the operating handle 17 between the spring legs.

In the operation of the improved rake the operating handle 1 is moved upwardly from out of engagement with the spring clip 21 so as to swing the U-shaped member 10 on the pivot pin 12, which will bring the stripping plate 6 downward and efficiently clean the teeth 3 of the rake. The end of the operating handle 17 is positioned between the legs of the spring clip 21 which holds the same in inoperative position.

From the foregoing description it can be seen that an improved rake cleaning device is provided which is simple and durable in construction, one that is formed of a minimum number of parts and one that is simple and easy to operate.

In practice, I have found that the form of my invention, illustrated in the accompanying drawings and referred to in the above description, as the preferred embodiment, is the most efficient and practical; yet realizing the conditions concurrent with the adoption of my device will necessarily vary, I desire to emphasize the fact that various minor changes in details of construction, proportion and arrangement of parts may be resorted to, when required without sacrificing any of the advantages of my invention as set forth.

What is claimed is:—

In a rake cleaner, the combination with a rake handle, a head secured to the handle and teeth carried by said head, of a substantially rectangular stripping plate having spaced parallel slots therein for receiving the teeth of a central plate extending rearwardly from said stripping plate, integral braces extending from said central plate to the stripping plate, a U-shaped member straddling said handle, a pivot pin extending through the legs of the U-shaped member and through said rake handle, the lower ends of said legs of the U-shaped member being bent to form feet, means attaching the feet to the central plate and the braces, an operating rod extending longitudinally of the rake handle and positioned on top of the same and connected to the bight portion of the U-shaped member, and means carried by the handle for engaging the operating rod.

In testimony whereof I affix my signature in presence of two witnesses.

MARY J. HAMBURGER.

Witnesses:
CHESTER A. CLOCK,
ALFRED C. EDWARDS.

Copies of this patent may be obtained for five cents each, by addressing the "Commissioner of Patents, Washington, D. C."